United States Patent
Bookbinder et al.

(10) Patent No.: US 8,464,556 B2
(45) Date of Patent: Jun. 18, 2013

(54) MICROSTRUCTURED OPTICAL FIBERS AND METHODS

(75) Inventors: Dana Craig Bookbinder, Corning, NY (US); Robert Brett Desorcie, Painted Post, NY (US); Mark Alan McDermott, Horseheads, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 792 days.

(21) Appl. No.: 12/151,170

(22) Filed: May 5, 2008

(65) Prior Publication Data

US 2008/0276650 A1    Nov. 13, 2008

Related U.S. Application Data

(60) Provisional application No. 60/928,165, filed on May 8, 2007.

(51) Int. Cl.
*C03B 37/018* (2006.01)

(52) U.S. Cl.
USPC .............. 65/421; 65/413; 65/417; 65/427

(58) Field of Classification Search
USPC .................... 65/427, 421, 417, 413
See application file for complete search history.

(56) References Cited

U.S. PATENT DOCUMENTS

| | | | |
|---|---|---|---|
| 4,148,621 A * | 4/1979 | Gliemeroth | 65/417 |
| 4,188,089 A * | 2/1980 | Gliemeroth et al. | 385/124 |
| 4,576,622 A * | 3/1986 | Jung | 65/531 |
| 5,191,206 A | 3/1993 | Boiarski et al. | 250/227.14 |
| 5,802,236 A | 9/1998 | DiGiovanni et al. | 385/127 |
| 6,243,522 B1 | 6/2001 | Allan et al. | 385/123 |
| 6,355,587 B1 * | 3/2002 | Loxley et al. | 501/54 |
| 6,474,106 B1 | 11/2002 | Crossland et al. | 65/377 |
| 6,614,974 B2 | 9/2003 | Elrefaie et al. | 385/125 |

(Continued)

FOREIGN PATENT DOCUMENTS

| | | |
|---|---|---|
| EP | 1617243 A1 | 3/2004 |
| EP | 1564569 A1 | 9/2004 |

(Continued)

OTHER PUBLICATIONS

Bing, Yao et al, "Low-loss Holey Fiber", Hitachi Cable Review No. 24, Aug. 2005, pp. 1-5.

(Continued)

*Primary Examiner* — Queenie Dehghan
(74) *Attorney, Agent, or Firm* — Robert L. Carlson

(57) ABSTRACT

Method of making a microstructured optical fiber. Silica glass based soot is deposited on a substrate to form at least a portion of an optical fiber preform by traversing a soot deposition burner with respect to said substrate at a burner traverse rate greater than 3 cm/sec, thereby depositing a layer of soot having a thickness less than 20 microns for each of a plurality of burner passes. At least a portion of the soot preform is then consolidated inside a furnace to remove greater than 50 percent of the air trapped in said soot preform, said consolidating taking place in a gaseous atmosphere containing krypton, nitrogen, or mixtures thereof under conditions which are effective to trap a portion of said gaseous atmosphere in said preform during said consolidation step, thereby forming a consolidated preform which when viewed in cross section will exhibit at least 50 voids therein.

16 Claims, 6 Drawing Sheets

U.S. PATENT DOCUMENTS

| | | | |
|---|---|---|---|
| 6,671,442 B2 | 12/2003 | Wang et al. | 385/125 |
| 6,687,445 B2 | 2/2004 | Carter et al. | 385/127 |
| 6,766,088 B2 | 7/2004 | Hasegawa et al. | 385/123 |
| 6,773,825 B2 | 8/2004 | Pickrell et al. | 428/566 |
| 6,795,635 B1 | 9/2004 | Fajardo et al. | 385/140 |
| 6,904,215 B2 | 6/2005 | Christoff et al. | 385/124 |
| 7,039,284 B2 | 5/2006 | Nakahara | 385/125 |
| 7,054,513 B2 | 5/2006 | Herz et al. | 385/12 |
| 7,072,552 B2 | 7/2006 | Manyam et al. | 385/125 |
| 7,142,758 B1 | 11/2006 | Herz et al. | 385/125 |
| 7,174,078 B2 | 2/2007 | Libori et al. | 385/125 |
| 2002/0134530 A1 | 9/2002 | Giacobbe | 165/58 |
| 2002/0197039 A1* | 12/2002 | Carter et al. | 385/127 |
| 2004/0005128 A1* | 1/2004 | DiGiovanni et al. | 385/123 |
| 2004/0069019 A1 | 4/2004 | Carter et al. | 65/414 |
| 2004/0240815 A1* | 12/2004 | Kuksenkov et al. | 385/123 |
| 2005/0011230 A1 | 1/2005 | Shirley et al. | 65/385 |
| 2005/0092030 A1* | 5/2005 | Balakrishnan et al. | 65/421 |
| 2005/0094954 A1 | 5/2005 | Pickrell et al. | 385/123 |
| 2006/0034574 A1 | 2/2006 | Guan et al. | 385/125 |
| 2007/0104437 A1 | 5/2007 | Bookbinder et al. | 385/125 |
| 2008/0013905 A1 | 1/2008 | Bookbinder et al. | 385/125 |
| 2008/0131066 A1 | 6/2008 | Bickham et al. | 385/125 |
| 2008/0166094 A1 | 7/2008 | Bookbinder et al. | 385/124 |

FOREIGN PATENT DOCUMENTS

| | | |
|---|---|---|
| WO | WO02/074709 | 9/2002 |
| WO | WO02/075393 | 9/2002 |
| WO | WO02/102730 | 12/2002 |

OTHER PUBLICATIONS

Matsuo, Shoichiro et al, "Bend-Insensitive and Low-Splice-Loss Optical Fiber for Indoor Wiring in FTTH", Optical Fiber Communication Conference, 2004, Feb. 23-27, 2004, vol. 2, 3 pp.

Baggett, Joanne C. et al, "Improving Bending Losses in Holey Fibers", Optical Fiber Communication Conference, 2005. Technical Digest. OFC/NFOEC, Mar. 6-11, 2005, vol. 3, 3 pp.

Ellis, Frederick P. K., "Fabrication of Random Hole Optical Fiber Preforms by Silica Sol-Gel Processing", Thesis to be submitted to Virginia Polytechnic Institute and State University, Feb. 19, 2004, 34 pp.

Guan, Ning et al, "Characteristics of field confined holey fiber analyzed by boundary element method", Optical Fiber Communication Conference and Exhibit, 2002, OFC 2002, Mar. 17-22, 2002, pp. 525-527.

Holton, Carvel et al, "Colloidal Quantum Dots Entrained in Microstructured Optical Fibers", Proceedings of SPIE, 2004, vol. 5335, pp. 258-265.

Kominsky, Daniel, "Development of Random Hole Optical Fiber and Crucible Technique Optical Fibers", Dissertation submitted to Virginia Polytechnic Institute and State University, Sep. 6, 2005, 142 pp.

Kominsky, D. et al, "Generation of random-hole optical fiber", Optics Letters, Aug. 15, 2003, vol. 28, No. 16, pp. 1409-1411.

Monro, Tanya M. et al, "Holey fibers with random cladding distributions", Optics Letters, Feb. 15, 2000, vol. 25, No. 4, pp. 206-208.

Monro, Tanya M. et al, "Holey fibers with randomly arranged air holes", Conference on Lasers and Electro-Optics, 2000. (CLEO 2000), pp. 607-608.

Monro, Tanya M. et al, "New possibilities with holey fibers", Optical Fiber Communication Conference, 2000, vol. 3, pp. 106-108.

Pickrell, Gary et al, "Fiber Optic Chemical Sensing", Proceedings of SPIE, vol. 5998, Nov. 5, 2005, 15 pp.

Pickrell, Gary et al, "Microstructural Analysis of Random Hole Optical Fibers", IEEE Photonics Technology Letters, Feb. 2004, vol. 16, No. 2, pp. 491-493.

Pickrell, Gary R. et al, "New fabrication technique for random-hole optical fibers", Proceedings of SPIE—The International Society of Optical Engineering, v 5589, Fiber Optic Sensor Technology and Applications III, Oct. 26-28, 2004, pp. 257-265.

Pickrell, Gary R. et al, "Novel Techniques for the Fabrication of Holey Optical Fibers", The International Society for Optical Engineering, v 4578, Fiber Optic Sensor Technology and Applications 2001, Oct. 30-Nov. 1, 2001, pp. 271-282.

Pickrell, G. et al, "Random-hole optical fiber evanescent-wave gas sensing", Optics Letters, Jul. 1, 2004, vol. 29, No. 13, pp. 1476-1478.

Pickrell, Gary R. et al, "Random Hole Optical Fibers", Proceedings of SPIE, Industrial and Highway Sensors Technology, 2003, vol. 5272, pp. 207-215.

Richardson, D. J. et al, "Advances in Microstructured Fiber Technology", Proceedings of 2005 IEEE/LEOS Workshop on Fibres and Optical Passive Components, Jun. 22-24, 2005, pp. 1-9.

Shinohara, Hiromichi, "Broadband Access in Japan: Rapidly Growing FTTH Market", IEEE Communications Magazine, Sep. 2005, pp. 72-78.

Wu, Tzong-Lin et al, "A Novel Ultraflattened Dispersion Photonic Crystal Fiber", IEEE Photonics Technology Letters, Jan. 2005, vol. 17, No. 1, pp. 67-69.

* cited by examiner

FIG. 7
FIG. 8
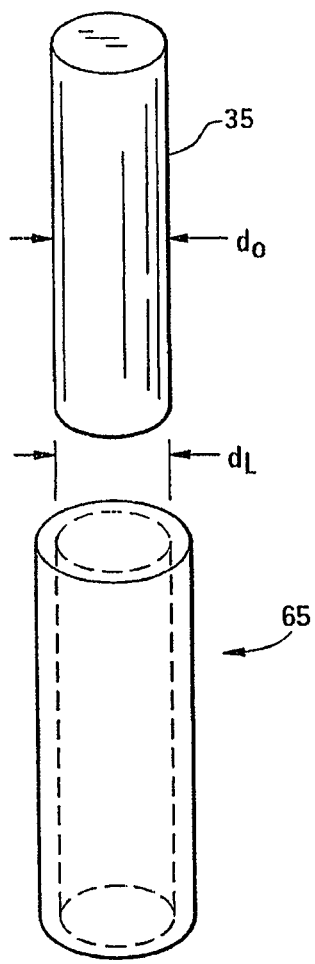
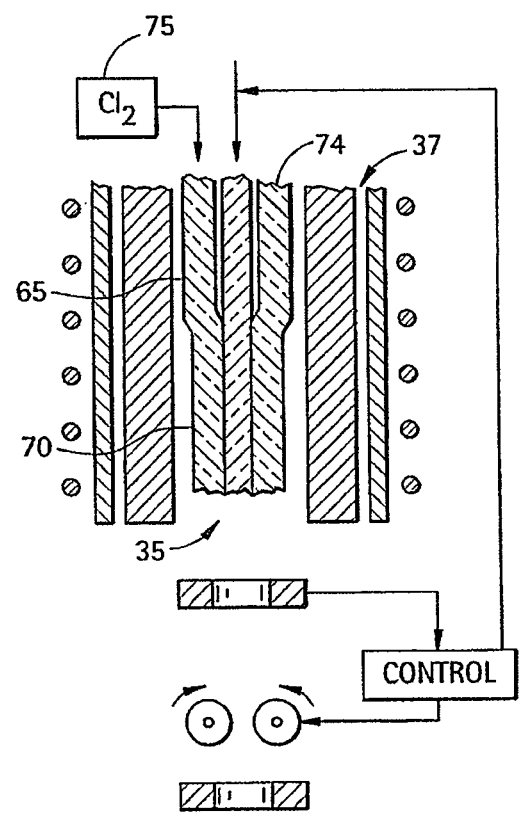

MICROSTRUCTURED OPTICAL FIBERS AND METHODS

CROSS-REFERENCE TO RELATED APPLICATIONS

This application claims the benefit of, and priority of U.S. Provisional Patent Application No. 60/928,165 filed on May 8, 2007, the content of which is relied upon and incorporated herein by reference in its entirety.

BACKGROUND OF THE INVENTION

1. Field of the Invention

The present invention relates generally to optical fibers, and more specifically to microstructured optical fibers and methods for making microstructured optical fibers.

2. Technical Background

Optical fibers formed of glass materials have been in commercial use for more than two decades. Although such optical fibers have represented a quantum leap forward in the field of telecommunications, work on alternative optical fiber designs continues. One promising type of alternative optical fiber is the microstructured optical fiber, which includes holes or voids running longitudinally along the fiber axis. The holes generally contain air or an inert gas, but may also contain other materials. The majority of microstructured fibers have a plurality of holes located around the core, wherein the holes continue for a relatively long (e.g. for many tens of meters or more) distance along the length of the fiber, and typically the holes extend along the entire length of the optical fiber. These cladding holes are also most typically arranged in a regular, periodic formation around the core of the optical fiber. In other words, if cross sections of the optical fiber are taken along the length of the optical fiber, the same individual holes can be found in essentially the same periodic hole structure relative to one another. Examples of such microstructured fibers include those described in U.S. Pat. No. 6,243,522.

Microstructured optical fibers may be designed to have a wide variety of properties, and may be used in a wide variety of applications. For example, microstructured optical fibers having a solid glass core and a plurality of holes disposed in the cladding region around the core have been constructed. The position and sizes of the holes may be designed to yield microstructured optical fibers with dispersions ranging anywhere from large negative values to large positive values. Such fibers may be useful, for example, in dispersion compensation. Solid-core microstructured optical fibers may also be designed to be single moded over a wide range of wavelengths. Most solid-core microstructured optical fibers guide light by a total internal reflection mechanism; the low index of the holes acts to lower the effective index of the cladding region in which they are disposed.

Microstructured optical fibers are typically manufactured by the so-called "stack-and-draw" method, wherein an array of silica rods and/or tubes are stacked in a close-packed arrangement to form a preform, that can be drawn into fiber using a conventional tower setup. There are several disadvantages to the stack and draw method. The awkwardness of assembling hundreds of very thin canes (defined by rods or tubes), as well as the possible presence of interstitial cavities when stacking and drawing cylindrical canes, may affect dramatically the fiber attenuation by introducing soluble and particulate impurities, undesired interfaces and inducing a reshaping or deformation of the starting holes. Moreover, the relatively low productivity and high cost make this method not much suitable for industrial production.

SUMMARY OF THE INVENTION

One aspect of the present invention relates to a method of making an optical fiber comprising depositing silica glass based soot on a substrate to form at least a portion of an optical fiber preform by traversing a soot deposition burner with respect to said substrate at a burner traverse rate greater than 3 cm/sec, thereby depositing a layer of soot having a thickness less than 20 microns for each of a plurality of burner passes; and consolidating said at least a portion of the soot preform inside a furnace to remove greater than 50 percent of the air trapped in said soot preform, said consolidating taking place in a gaseous atmosphere containing krypton, nitrogen, or mixtures thereof under conditions which are effective to trap a portion of said gaseous atmosphere in said preform during said consolidation step, thereby forming a consolidated preform which when viewed in cross section will exhibit at least 50 voids therein. In one embodiment, nitrogen and optionally helium are utilized as the gaseous atmosphere. In another embodiment, krypton and optionally helium are utilized as the gaseous atmosphere. Alternatively, the gaseous atmosphere could include a mixture of nitrogen and krypton, and optionally helium.

The soot preform is consolidated in a gaseous atmosphere which surrounds the preform under conditions which are effective to trap a portion of the gaseous atmosphere in the preform during said consolidation step, thereby resulting in the formation of non-periodically distributed holes or voids in the consolidated preform, each hole corresponding to a region of at least one trapped consolidated gas within the consolidated glass preform. Preferably, the burner traverse rate in said depositing step is greater than 4 cm/sec, more preferably greater than 5 cm/sec, even more preferably greater than 7 cm/sec, even more preferably greater than 10 cm/sec and the depositing step comprises depositing a layer of soot having a thickness greater than zero, more preferably greater than 1 micron, and less than 20 microns, more preferably less than 15 microns, and most preferably less than 15 microns for each of a plurality of burner passes. Preferably, subsequent to the consolidation step and prior to a step of drawing the preform into an optical fiber, the consolidated preform having voids therein is drawn into a cane to thereby reduce the diameter of the consolidated preform having voids therein to a outer preform diameter which is preferably less than 0.75, more preferably less than 0.66, but still greater than 5 mm, under conditions which are effective to cause said voids to expand in diameter during the redraw step.

The consolidated preform having holes therein is then used to make an optical fiber. At least some of the holes formed in the optical fiber preform during the consolidation step remain in the drawn optical fiber. By designing the hole containing region to correspond to the cladding of the optical fiber, these resultant optical fiber can be made to exhibit a core region with a first refractive index and a cladding region having a second refractive index lower than that of the core, the lower refractive index at least partly due to the presence of the holes in the cladding. Alternatively or additional the methods disclosed herein can be used to provide a hole containing region within the cladding to thereby improve the bend performance of the optical fibers. For example, using the fiber designs and methods disclosed herein, it is possible to create optical fiber which exhibits an increase in attenuation at 1550 nm when bent around a 10 mm mandrel which is less than 20 dB/turn, more preferably less than 15 dB/turn, and even more preferably less than 10 dB/turn. Similarly, using the fiber designs and methods disclosed herein, it is possible to create an optical fiber which exhibits an attenuation increases at 1550 nm of less than 3 dB/turn, more preferably less than 1 dB/turn, even more preferably less than 0.5 dB/turn, and most preferably less than 0.25 dB/turn when bent around a 20 mm diameter mandrel. The methods and fiber designs described herein are useful for making both fibers that are single moded and fibers that are multimoded at 1550 nm.

Preferably, the voids are located substantially, and more preferably entirely in the cladding of the fiber such that they surround the core in a void containing region, and the voids are preferably substantially absent from the core region. In some preferred embodiments, the voids are located in void containing regions which are spaced apart from the core of the optical fiber. For example, a relatively thin (e.g. having a radial width less than 40 microns, and more preferably less than 30 microns) ring of a void containing region can be spaced apart from the core of the optical fiber, but not extending entirely to the outer perimeter of the optical fiber. Spacing the void containing region apart from the core will assist in lowering the attenuation of the optical fiber 1550 nm. Using a thin ring will facilitate making the optical fiber single moded at 1550 nm. The optical fiber may or may not include germania or fluorine to also adjust the refractive index of the core and or cladding of the optical fiber, but these dopants can also be avoided and instead, the voids alone can be used to adjust the refractive index of the cladding with respect to the core such that light is guided down the core of the fiber. Using the consolidation techniques disclosed, optical fibers can be formed whose cross-sections exhibit a non-periodic distribution of holes therein. By non-periodic distribution, we mean that when one views a cross section of the optical fiber, the voids are randomly or non-periodically distributed across a portion of the fiber. Cross sections taken at different points along the length of the fiber will exhibit different cross-sectional hole patterns, i.e., various cross sections will have slightly different randomly oriented hole patterns, distributions, and sizes. These holes are stretched (elongated) along the length (i.e. parallel to the longitudinal axis) of the optical fiber, but do not extend the entire length of the entire fiber. While not wishing to be bound by theory, it is believed that the holes extend less than a few meters, and in many cases less than 1 meter along the length of the fiber.

Using the void producing consolidation techniques disclosed herein, it is possible to make optical fibers having cladding regions which exhibit a total fiber void area percent (i.e., total cross-sectional area of the voids divided by total cross-sectional area of the optical fiber×100) greater than 0.01 percent, more preferably greater than 0.025 percent, even more preferably greater than 0.05 percent, even more preferably greater than about 0.1 percent and even more preferably greater than about 0.5 percent. Fibers have been made having total void area percents greater than about 1, and in fact even greater than about 5 or even 10 percent. However, it is believed that, depending on fiber design, total void area percent of less than 1, and even less than 0.7, would result in greatly improved bend performance. In some preferred embodiments, the total void area percent in said fiber is less than 20, more preferably less than 15, even more preferably less than 10, and most preferably less than 5 percent. In other preferred embodiments, the total void area percent in said fiber is less than 0.7 percent and greater than 0.01 percent. Such void containing cladding regions can be used to lower the refractive index relative to the core and thus form the cladding region which guides light along the core of the optical fiber. By selecting the appropriate soot consolidation conditions, as will be described below, a variety of useful optical fiber designs can be achieved. For example, by selecting the maximum void size in the cladding to be less than that of the wavelength of light which is to be transmitted (for example, less than 1550 nm for some telecommunications systems), and preferably less than one half of the wavelength of light which is to be transmitted along the fiber, low attenuation fibers can be achieved without having to use expensive dopants. Consequently, for a variety of applications, it is desirable for the holes to be formed such that at least greater than 95% of and preferably all of the holes in the optical fiber exhibit a maximum hole size in the cladding for the optical fiber which is greater than 10 nm, more preferably greater than 20 nm and less than 1550 nm, more preferably less than 775 nm, most preferably less than about 390 nm. Likewise, it is preferable that the mean diameter of the holes in the fiber be greater than 10 nm, more preferably greater than 20 nm and less than 7000 nm, more preferably less than 2000 nm, and even more preferably less than 1550 nm, and most preferably less than 775 nm, all of which mean diameters are achievable using the methods disclosed herein. The fibers made using the methods disclosed herein can achieve these mean diameters to within a standard deviation of 1000 nm, more preferably to within a standard deviation of 750 nm, and most preferably to within a standard deviation of 500 nm. In some embodiments, the fibers disclosed herein have less than 5000 holes, in some embodiments less than 1000 holes, and in some embodiments the total number of holes is less than 500 holes in a given optical fiber perpendicular cross-section. Of course, the most preferred fibers will exhibit combinations of these characteristics. Thus, for example, one particularly preferred embodiment of optical fiber would exhibit less than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800X and image analysis software, such as ImagePro, which is available from Media Cybernetics, Inc. of Silver Spring, Md., USA. In other preferred embodiments and to facilitate achieving a higher average number density, the annular hole containing region comprises greater than 100 holes when said fiber is viewed in cross-section, more preferably greater than 200 holes when said fiber is viewed in cross-section, even more preferably greater than 400 holes when said fiber is viewed in cross-section, and most preferably greater than 600 holes when said fiber is viewed in cross-section. In fact, the techniques disclosed herein are sufficient to result in greater than 1000, and even greater than 2000 holes in the annular ring of the fiber, even for annular rings which have a width of less than 10, and more preferably less than 7 microns. In other preferred embodiments, the microstructured optical fiber disclosed herein comprises a core region disposed about a longitudinal centerline, and a cladding region surrounding the core region, the cladding region comprising an annular hole-containing region comprised of non-periodically disposed holes, wherein the annular hole-containing region has a maximum radial width between 2 and 10 microns and the annular hole-containing region has a regional void area percent between 2 and 10 percent. The non-periodically disposed holes have a mean diameter of less than 500, preferably less than 300 and more preferably less than 200 nm and greater than 5 nm.

Another aspect of the present invention relates to the microstructured optical fibers which can be made using the process described above. One such microstructured optical fiber includes a core region having a first refractive index and a cladding region having a second refractive index which is lower than that of the core region due at least partially to the presence of the non-periodically distributed voids therein. Light which is to be transmitted through the fiber is thereby retained generally within the core. The voids preferably have a maximum diameter of 1550 nm or less and the resultant optical fiber exhibits an attenuation at least one wavelength between 600 and 1550 nm (most preferably the wavelength is 1550 nm) which is less than 500 dB/km, more preferably less than 200 dB/km at 1550 nm. By "attenuation", as used herein and if not specifically designated as "multimode attenuation" or "single mode attenuation", we mean the multimode attenuation of said fiber if the fiber is multimoded at 1550 nm and the single mode attenuation if the fiber is single moded at 1550 nm. Using the void producing consolidation techniques disclosed herein, it is possible to make optical fibers having cladding regions which exhibit a regional void area percent greater than 0.5 percent, more preferably greater than about 1, even more preferably greater than about 5 and most preferably greater than about 10 percent. In particular, it is possible to produce such void containing cladding regions within a 10 micron distance of the core of the optical fiber. While index of refraction adjusting dopants may be avoided using the techniques disclosed herein, preferably at least one of germania or fluorine or a similar index of refraction adjusting dopant is employed together with the non-periodically distributed voids located in the cladding region of the optical fiber. However, use of germania and/or fluorine is not critical and, for example, the fiber could if desired be entirely or substantially devoid of both germania and fluorine. As used herein, by non-periodically distributed, we mean that the voids or holes are non-periodic, i.e., they are not periodically disposed within the fiber structure. While the methods of the present invention are not capable of periodic placement of each individual void with respect to other individual voids, as may be the case with some other types of microstructured fibers, the methods disclosed herein are capable of enabling the placement of large or small relative amounts of voids at various locations within the radial distribution of the optical fiber. For example, using the methods disclosed herein a higher regional void area percent of voids can be placed in a region which is adjacent the core of the optical fiber compared to other regions in the fiber (e.g., in the core of the fiber or the outer cladding region of the optical fiber). Likewise, the average hole size and hole size distribution in the void containing region can be controlled both in a radial and axial (i.e., along the length) direction of the fiber. Consequently, a uniform non-periodic array of holes can be located at a region in the fiber, and the relative void area percent and average hole size in this region is maintained consistently along the length of the fiber. While the fibers are not limited to any particular diameter, preferably the outer diameter of the fiber is less than 775, more preferably less than 375, and most preferably less than 200 microns.

Such a fiber can be used in telecommunication networks (typically 850, 1310 and 1550 nm windows) including longhaul, metro, access, premise and data centers as well as data communication applications and control area networks within buildings and mobile (auto, bus, train, plane) applications (typically 600 to 1000 nm range). Such telecommunications networks typically include a transmitter and receiver which is optically connected to the optical fiber. Consequently, for a variety of applications, it is desirable for the holes to be formed such that the maximum hole size in the cladding for the optical fiber is less than 1550 nm, more preferably less than 775 nm, most preferably less than about 390 nm.

Such fibers can also be used as UV to IR light-pipes for medical, illumination, lithography and industrial applications. The cladding of one preferred fiber comprises a plurality of non-periodically distributed void regions in the cladding, preferably located within a 10 micron radial distance from the core, wherein such voids having a maximum diameter, as measured in the radial direction (cross-section perpendicular to the longitudinal fiber axis) of the fiber, of 1550 nm or less, more preferably 775 nm or less. The cladding of another preferred fiber, comprises a plurality of non-periodically distributed void regions in the cladding, spaced from the core and within 20 microns radial distance from the core, wherein such voids having a maximum diameter, as measured in the radial direction of the fiber, of 1550 nm or less, more preferably 775 nm or less, most preferably less than about 390 nm. The cladding of yet another preferred fiber, comprises a plurality of non-periodically distributed void regions in the cladding, within 40 microns radial distance from the outside edge of the core, wherein such voids having a maximum diameter, as measured in the radial direction of the fiber, of 1550 nm or less, more preferably 775 nm or less, most preferably less than about 390 nm. The optical fibers disclosed herein result in a number of advantages compared to various optical fibers known in the prior art. For example, the fibers disclosed herein are capable of superior bend resistance compared to fibers of the prior art while simultaneously exhibiting excellent mode field diameters. By superior, we mean that using the methods disclosed herein, it is possible to make fibers which are single moded at 1550 nm and capable of less than 0.5 dB attenuation increase at 1550 nm per turn for a 20 mm diameter bend while simultaneously exhibiting mode field diameters greater than 10 microns, and more preferably greater than 11 microns, at 1550 nm. Such excellent bend performance makes these fibers attractive candidates for fiber-to-the-home, access fiber, fiber-in-the-home applications, and fiber jumpers (these are typically short sections of fiber (1-20 meters) with connectors on each end to connect to an optical system or device). For example, the fibers disclosed herein may be employed in an optical fiber telecommunications system comprising a transmitter, a receiver, the fiber(s) being optically connected to said transmitter and receiver. Preferably in such applications (i.e. when the fiber is acting as a transmission fiber in a telecommunications system) the fiber is devoid of any active elements such as erbium, etc.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIGS. 7 and 8 together illustrate a rod in tube manufacturing process which may be employed with various methods of the present invention.

DETAILED DESCRIPTION OF THE PREFERRED EMBODIMENTS

Figure 1:
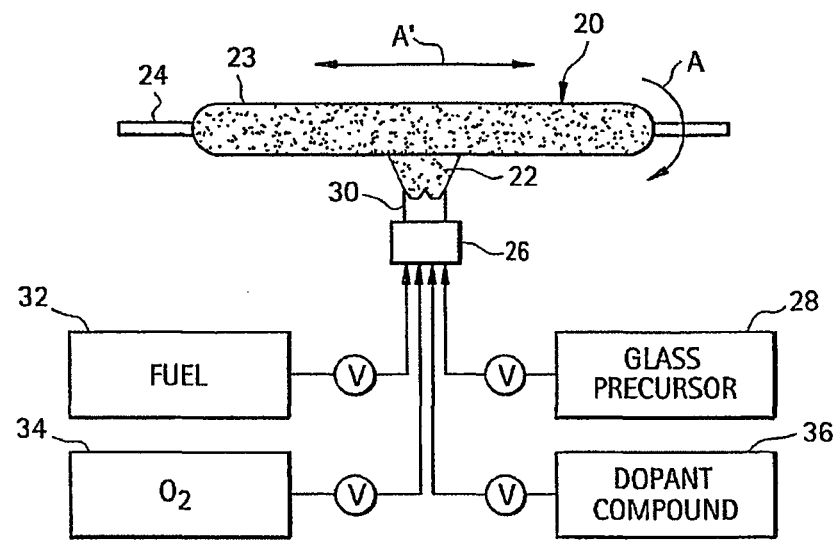
FIG. 1 illustrates an OVD method for forming a soot preform.

The methods of the present invention utilizes preform consolidation conditions which are effective to result in a significant amount of gases being trapped in the consolidated glass blank, thereby causing the formation of voids in the consolidated glass optical fiber preform. Rather than taking steps to remove these voids, the resultant preform is used to form an optical fiber with voids therein.

During the manufacture of transmission optical fibers by conventional soot deposition processes such as the outside vapor deposition (OVD) process or the vapor axial deposition (VAD) process, silica and doped silica particles are pyrogenically generated in a flame and deposited as soot. In the case of OVD, silica soot preforms are formed layer-by-layer by deposition of the particles on the outside of a cylindrical target rod by traversing the soot-laden flame along the axis of the cylindrical target. Such porous soot preforms are subsequently treated with a drying agent (e.g., chlorine) to remove water and metal impurities and are then consolidated or sintered inside a consolidation furnace into void-free glass blanks at temperatures ranging from 1100-1500° C. Surface energy driven viscous flow sintering is the dominant mechanism of sintering, which results in densification and closing of the pores of the soot, thereby forming a consolidated glass preform. During the final stages of sintering, the gases used in consolidation may become trapped as the open pores are closed. If the solubility and permeability of the trapped gases in the glass are high at the sintering temperature, then the gases are able to migrate through and out of the glass during the consolidation process. Alternatively, gases which are still trapped after the consolidation phase of the fiber manufacturing process may be outgassed by holding the fiber preforms for a period until the gases migrate out through the glass preforms, thereby leaving one or more voids with vacuum therein within the preform. During the draw operation when the optical fiber is drawn from the preform, these voids close, leaving a void-free or essentially void-free optical fiber. In consolidation processes which are employed to make conventional transmission optical fiber, the goal is to achieve an optical fiber that is entirely free of voids in both the core and cladding region of the optical fiber. Helium is often the gas utilized as the atmosphere during the consolidation of conventional optical fiber preforms. Because helium is very permeable in glass, it very easily exits the soot preform and the glass during the consolidation process, so that after consolidating in helium the glass is free of pores or voids.

The present invention utilizes preform consolidation conditions which are effective to result in a significant amount of gases being trapped in the consolidated glass blank, thereby causing the formation of non-periodically distributed voids in the consolidated glass optical fiber preform. Rather than taking steps to remove these voids, the resultant preform is purposefully used to intentionally form an optical fiber with voids therein. In particular, by utilizing relatively low permeability gases and/or relatively high sintering rates, holes can be trapped in the consolidated glass during the consolidation process. The term sintered or consolidated glass, as used herein, refers to glass that has gone through a soot consolidation step after a chemical vapor deposition soot deposition process such as the OVD or VAD processes. During the soot consolidation step, the soot goes through a densification process via exposure to high heat, thereby removing the open porosity (i.e., voids or pores between the soot which is not surrounded by densified glass) and leaving fully densified glass (although in the present invention some closed pores (i.e., voids or pores surrounded by fully densified glass) obviously remain. Such soot consolidation step preferably takes place in a soot consolidation furnace. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform.

FIG. 1 illustrates a method of manufacturing a soot optical fiber preform 20 which can be used in accordance with the present invention. In the embodiment illustrated in FIG. 1, soot preform 2 is formed by depositing silica-containing soot 22 onto an outside of a rotating and translating mandrel or bait rod 24. This process is known as the OVD or outside vapor deposition process. Mandrel 24 is preferably tapered. The soot 22 is formed by providing a glass precursor 28 in gaseous form to the flame 30 of a burner 26 to oxidize it. Fuel 32, such as methane ($CH_4$), and combustion supporting gas 34, such as oxygen, are provided to the burner 26 and ignited to form the flame 30. Mass flow controllers, labeled V, meter the appropriate amounts of suitable dopant compound 36 silica glass precursor 28, fuel 32 and combustion supporting gas 34, all preferably in gaseous form, to the burner 26. The glass former compounds 28, 36 are oxidized in the flame 30 to form the generally cylindrically-shaped soot region 23. In particular, a dopant compound 36 may be included if desired. For example, a germanium compound may be included as an index of refraction increasing dopant (e.g. in the core of the fiber), or a fluorine containing compound may be included to lower the index of refraction (e.g. in the cladding and/or void containing region of the fiber).

In some preferred embodiments, the soot deposition process may be different depending on whether the soot being deposited is intended to form a void containing or non-void containing region in the fiber. Applicants have determined that the voids tend to form at the interface of each laydown pass, i.e. between soot layers. Consequently, the size of the voids in the resultant optical fiber can be reduced and they can be packed better (less distance between voids which are located between different pairs of soot layers) if soot layer thickness in each pass is reduced. Consequently, the soot layer thickness is preferably less than 20 microns, more preferably less than 15 microns, and most preferably less than 10 microns thick for each pass of soot deposited by the soot deposition burners. This may be achieved by using a faster traversing burner, e.g. a burner traverse rate of greater than 2 cm/sec, more preferably greater than 3 cm/sec, and most preferably greater than 4 cm/sec. However, for the soot deposition steps used to make the non-void containing regions of the optical fiber, the soot deposition process in many cases may comprise a slower burner traverse rate, e.g. less than 5, 4, or 3 cm/sec. Consequently, in some embodiments used to deposit soot for an optical fiber preform having both void containing regions and non-void containing regions, a portion of the preform is made using soot which was deposited at a first speed, and another portion of the preform is made using soot which was deposited at a second speed, wherein the first speed is different than the second speed. In some embodiments, again to facilitate deposition of a thinner soot deposited layer, it is preferable to employ no more than 4, more preferably no more than 3, and most preferably no more than 2 burners adjacent one another while the burners are reciprocating back and forth with respect to the soot deposition substrate.

Figure 3:
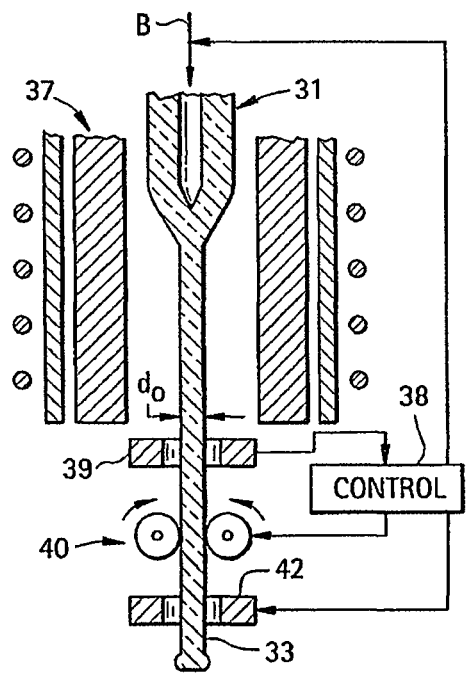
FIG. 3 illustrates a redraw process for forming a core cane.
Figure 2:
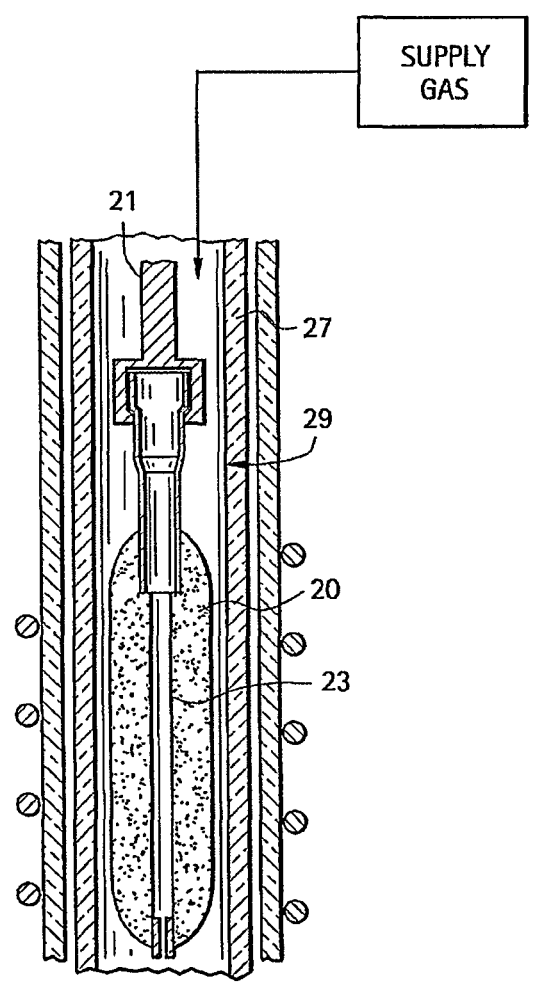
FIG. 2 illustrates a cross-sectional side view of a consolidation process in accordance with the invention.

As illustrated in FIG. 2, the soot preform 20 including the cylindrical soot region 23 may be consolidated in a consolidation furnace 29 to form a consolidated blank 31 (shown in subsequent FIG. 3). Prior to consolidation, the mandrel 24 illustrated in FIG. 1 is removed to form a hollow, cylindrical soot blank preform. During the consolidation process, the soot preform 20 is suspended, for example, inside a consolidation furnace 29 such as, for example, pure quartz muffle tube 27 of the consolidation furnace 29 by a holding mechanism 21. Preferably, before the consolidation step the preform 20 is exposed to a drying atmosphere. For example, a suitable drying atmosphere may include about 95 percent to 99 percent helium and 1 percent to 5 percent chlorine gas at a temperature of between about 950° C. and 1250° C. and a suitable drying time ranges from about 0.5 and 4.0 hours. The soot preform can also be doped, if desired, for example using a dopant gas having fluorine or other optical fiber dopants therein. For example, to dope with fluorine, $SiF_4$ and/or $CF_4$ gas may be employed. Such dopant gases may be employed using conventional doping temperatures, for example between about 950 and 1250° C. for 0.25 to 4 hours.

During the consolidation step, which preferably takes place after a soot drying step, the furnace temperature is held at a suitable temperature and the preform 20 is consolidated at a suitable temperature, for example between about 1390° C. and 1535° C. to form a consolidated preform. Alternatively, gradient sintering may be employed whereby the soot preform 20 is driven down through a hot zone of the furnace 29 which is maintained at a temperature of between about 1225° C. to 1550° C., more preferably between about 1390° C. and 1535° C. For example, the preform may be held in an isothermal zone which is maintained at a desired drying temperature (950-1250° C.), after which the soot preform is driven through a zone which is maintained at a desired consolidation temperature (e.g. 1225° C. to 1550° C., more preferably 1390° C. to 1535° C.) at a rate of speed which is sufficient to result in the preform 20 temperature increasing by greater than 1° C./min. Upper zones of the furnace can be maintained at lower temperatures which facilitate a drying and impurity removal step. The lower zone can be maintained at the higher temperatures desired for consolidation. In one preferred embodiment, the soot containing preform is downfed through a consolidation hot zone at a first downfeed rate, followed by downfeeding of the preform through a second hot zone at a second downfeed rate which is less than that of the first downfeed rate. Such a consolidation technique results in the outside portion of the soot preform sintering before the rest of the preform sinters, thereby facilitating trapping of gases which will in turn facilitate formation of and retaining of voids in the resultant consolidated glass. For example, the preform can be exposed to such suitable consolidation temperatures (e.g. greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./min, more preferably greater than 14° C./min. Preferably, the first consolidation rate results in the outside of the preform increasing in temperature at a rate which is greater than 2, more preferably greater than 10, even more preferably greater than about 20, and most preferably greater than 50° C./min higher than the heating rate of the second consolidation rate. If desired, a third consolidation step or even 5 or more additional consolidation steps can be employed which heats at a slower rate (e.g. less than 10° C./min). Alternatively, the soot preform can be sintered at even faster rates in order to create more voids by driving the soot preform through a furnace hot zone where the temperature is greater than 1550° C., more preferably greater than 1700° C., even more preferably greater than 1900° C. Alternatively, the soot preform can be sintered at even faster rates external to the furnace by using an open flame or plasma torch in contact with the soot.

Preferred sintering gases (i.e., the gas that surrounds the preform during the sintering step) which may be used in the consolidation step are those which comprise at least one gas selected from the group consisting of nitrogen, argon, $CO_2$, oxygen, chlorine, CF4, CO, SO2, krypton and mixtures thereof. Each of these gases exhibits a relatively low permeability in silica glass at or below the consolidation temperature which is suitable for forming voids in accordance with the methods present invention. Preferably these void producing gases are employed either alone or in combination in an amount between 5 and 100 percent by volume, more preferably between about 20-100 percent by volume and most preferably between about 40-100 percent by volume. The remainder of the sintering gas atmosphere is made up of a suitable diluent or carrier gas such as, for example, helium, hydrogen, deuterium, or mixtures thereof. It some of the embodiments described herein, e.g. when additional soot is planned to be deposited via OVD to the resultant glass preform or cane subsequent to the void producing consolidation process, it is preferable to utilize a sintering gas which employs less than 10 percent oxygen, more preferably less than 5 percent oxygen, and most preferably essentially no oxygen, otherwise due to exposure to hydrogen formed in the OVD process, some seeds might be lost. Generally speaking, the greater the percentage by volume of void producing gases (nitrogen, Ar, $CO_2$, $O_2$, $Cl_2$, CF4, CO, SO2, krypton, or mixtures thereof) that is employed in the sintering gas, the larger and more abundant the voids will be in the resultant consolidated glass. More preferably, the sintering gas for use in forming the voids during the consolidation step comprises at least one gas selected from the group consisting of nitrogen, argon, $CO_2$, oxygen, and krypton, and mixtures thereof. These gases can be utilized entirely alone or in mixtures of such gases along with a carrier gas such as helium. One particularly preferred void producing gas is nitrogen. Applicants have found when employing nitrogen and/or argon either together or individually as a void producing sintering gas it is preferred that the nitrogen and/or argon be employed in the sintering atmosphere in an amount greater that 10 percent by volume, more preferably greater than 30 percent by volume, even more preferably greater than about 50 percent by volume, and most preferably greater than about 65 percent by volume, with the remainder of the sintering atmosphere being a carrier gas such as helium. These gases have been successfully employed at concentrations greater than 85 percent by volume. In fact, up to 100 percent nitrogen gas, up to 100 percent argon gas, and up to 100 percent oxygen gas have been utilized successfully. Voids can also be created by sintering the soot in a low permeability gas (e.g. nitrogen, argon, $CO_2$, oxygen, Chlorine, CF4, CO, SO2) under a partial vacuum (e.g., wherein the preform is immersed in a sintering atmosphere is at a pressure of between about 40 to 750 Torr). Using the void producing consolidation techniques disclosed herein, it is possible to make optical fibers having a cladding comprises a void containing region having a void regional void area percent greater than 0.5 percent, more preferably greater than about 1, even more preferably greater than about 5 and most preferably greater than about 10 percent. Regional void area percent, as used herein, means the total area of the voids in a void containing region divided by the total area of the void containing region (when the optical fiber is viewed in cross-section taken perpendicular to the axis of the optical fiber) times 100, the void containing region being defined by the inner and outer boundaries of the void containing region. For example, if the inner edge of the innermost void in the fiber has a radial location of 4 microns from the axial centerline of the fiber, and the outer edge of the outer most void in the fiber has a radial location of 60 microns from the centerline, then the area of the void containing region is approximately 11309−50=11259 square microns. If the total cross sectional area of voids contained in this void containing region is 1100 square microns, then the void area percent of the void containing region is approximately 9.8 percent.

Using the preferred sintering gases described above, it is desirable to employ a consolidation process which includes a downfeed of the preform at a rate and temperature which is sufficient to result in at least some of the consolidation gases being intentionally trapped. This can occur, for example, by heating of at least a portion of the soot preform greater than about 10° C./min, more preferably greater than about 12° C./min, even more preferably greater than about 14° C./min. The sintering temperatures employed in the present invention preferably are greater than 1100° C., more preferably greater than 1300° C., even more preferably greater than 1400° C., and most preferably greater than 1450° C. One particularly preferred sintering temperature is approximately 1490° C.

At each step in the manufacturing process which involves deposition of soot onto a substrate, the soot can be consolidated and drawn into a smaller diameter glass object known as a cane. As used herein, a cane is an intermediate glass preform formed by drawing a consolidated glass preform into a smaller diameter. The cane is then used to as a precursor to deposit additional soot onto the cane, and thereafter the additional deposited soot is consolidated to remove a significant portion (e.g., greater than 50 percent) of the gas from the soot preform. Multiple cane drawing steps can be employed to make the fibers disclosed herein. In fact, it is in some cases desirable to draw an intermediate cane after each soot deposition step that will result in each of the core, a first annular cladding region, and a second annular void-containing cladding region which surrounds the first annular region and preferably is spaced from the core by the first cladding region. The final cane drawing step occurs just prior to the last soot deposition step, e.g. prior to the outer annular cladding region being deposited over the void containing region. Thus, such a process could involve as many as three cane drawing steps, after which additional cladding is deposited onto the drawn cane to form the outer cladding. After this outer cladding is consolidated, the resultant optical fiber preform is ready to be drawn into optical fiber. FIG. 3 illustrates a process which may be used to draw a core or cladding cane for use in the present invention. For example in one such embodiment, a soot preform is formed as described above with respect to FIG. 1, after which the soot preform is consolidated using conventional consolidation techniques (e.g., using consolidation temperatures of higher than 1300° C. in an atmosphere of 100 percent helium) to form a void free core preform. For example, in the case of a fiber preform which is to be used to make a pure silica core fiber, the core preform would consist of relatively pure silica with no significant index of refraction adjusting dopants. Alternatively, in the case of an optical fiber preform which is to be used to make a pure germania doped core fiber, the core preform could consist of a germania doped core region and optionally a portion of the cladding (e.g. undoped silica cladding). The resultant consolidated core blank 31 is placed in a core cane draw furnace 37 and at least one rod-shaped core cane segment 33 having a reduced outer diameter is drawn therefrom. The preform blank 31 is heated to a temperature of, for example, between about 1700° C. and 2000° C. If the glass which was deposited and consolidated immediately preceding the cane drawing step is intended to have randomly distributed voids retained therein, the cane drawing process is preferably done using a relatively fast draw speed (greater than 5 cm per minute, more preferably greater than 7 cm per minute, and most preferably greater than 9 cm per minute) under temperatures which are as high as 1650-1900° C. In some embodiments, the drawing of the optical fiber preform is conducted under temperatures between about 1800-1900° C. In some preferred embodiments, the drawing of the optical fiber preform is conducted under temperatures between about 1650-1775° C. Utilizing lower redraw temperatures and faster redraw speeds, the voids will have less opportunity to expand under high temperature due to the presence of nitrogen gas being contained within the voids. On the other hand, if the glass deposited in the deposition step immediately preceding the cane drawing step is not intended to have randomly distributed voids therein, i.e., the outer glass region of that particular cane is intended to be void free glass), the cane drawing process is preferably done using a relatively slower draw speed (less than 2 cm/min. more preferably less than 3 cm per minute, and most preferably less than 4 cm per minute) under temperatures which are as high as 1650-1900° C. In some preferred embodiments, the drawing of the optical fiber preform (which comprises the core region, the inner cladding region, and the annular void containing ring region) into a core cane is conducted under temperatures between about 1650-1775° C.

Consequently, in a preferred embodiment used to make a optical fiber preform having both void containing regions and non-void containing regions, a portion of the preform is made using a cane drawing step which comprises a first draw speed, and another portion of the preform is made using a cane drawing step which comprises a second draw speed, wherein the first speed is different than the second speed. In fact, it is preferable to operate all of the cane drawing steps at the faster cane draw speeds, with the exception that the cane drawn after the consolidation step which results in the void containing region should preferably occur at the slower draw rate.

The controls 38 control the tension applied to the cane by suitable control signals to a tension mechanism 40, shown here as two tractor wheels, to draw down the cane 33 at the proper speed. In this way, it is possible to derive a length of core cane 33 having an outer diameter dimension of for example between about 1 mm and 16 mm. This core cane can then be used as the target or mandrel 24 for additional soot deposition or as the rod in a rod in tube process, as will be described further below.

Figure 4:
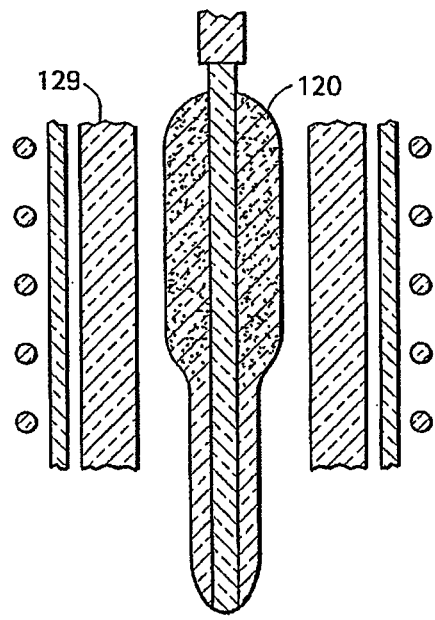
FIG. 4 illustrates consolidation of soot which has been deposited onto a core cane.

In one preferred embodiment, the process described above with respect to FIG. 3 can be used to form a core cane blank which can then be used as the target or mandrel for additional soot deposition which will be consolidated using the void forming techniques disclosed herein and thus eventually become the cladding of the optical fiber. In one such embodiment, for example, a fully consolidated, void free glass core cane can be used as the bait rod 24 in the soot deposition step illustrated in FIG. 1. The glass core cane may be undoped silica so the resultant optical fiber will be silica core fiber whose core consists essentially of pure silica. Alternatively, the core cane may consist of one or more doped regions which together form the light transmitting core region of the optical fiber. After the soot is deposited onto the glass core cane, the outer soot region 120 can be fully consolidated in consolidation furnace 129 as illustrated in FIG. 4. Preferably, during this consolidation step, the void forming consolidation process described above is carried out to form a void containing consolidated optical fiber preform 150, as illustrated in FIG. 5.

The sintering temperatures employed in the present invention preferably range from 1100° C. to 1550° C., more preferably between 1300° C. and 1500° C., and most preferably between 1350° C. and 1500° C. One preferred sintering temperature is approximately 1490° C. The gaseous atmosphere employed during the consolidation process, the temperature inside the consolidation furnace, and preform consolidation rate are selected so that, during the soot consolidation process, gases are intentionally trapped within the preform, forming holes in the consolidated glass. These gas containing voids are preferably not entirely outgassed prior to and/or during the fiber draw process, so that the voids remain in the fiber after the fiber has been drawn. A variety of process parameters can be controlled to vary and control the size of the voids. For example, increasing the consolidation time or temperature can increase the void size, as the increased temperature causes the gases trapped within the voids to expand. Similarly, the size and area percent of the voids can be impacted by the draw conditions. For example, a longer hot zone in a draw furnace and/or faster draw speeds tend to increase the size as well as the area percent of the holes. Selection of a gas that is more permeable in glass at the consolidation temperature will result in smaller voids. Sintering rate can also have a significant effect on hole size and hole quantity. A faster sintering rate will result in the formation of more and larger voids. However, use of sintering rates that are too slow will result in no voids being formed, as the gas will have time to escape through the glass. Consequently, the downfeed rate of the preform and/or the consolidation temperature employed are preferably high enough to result in the heating of at least a portion of the preform at a rate greater than about 10° C./min, more preferably greater than about 12° C./min, even more preferably greater than about 14° C./min. Generally speaking, an optical fiber preform having a lower soot density will result in formation of more voids. However, the density of the deposited soot in a particular optical fiber preform can be varied to position more holes (higher regional void area percent) where desired. For example, a first high density soot region can be deposited directly onto a consolidated glass (e.g. pure silica) core cane, followed by a second region of soot having a lower density than that of the first. We have found that this causes a higher void area percent to form near the core (i.e. in the high density soot region). The silica containing soot preferably has a bulk density of between about 0.10 g/cc and 1.7 g/cc, more preferably between about 0.30 g/cc and 1.0 g/cc. This effect can also be used to form consolidated void containing preforms which alternate between low or no void containing regions and higher void containing regions; wherein the initial soot density radial variation is greater than 3 percent over a distance of at least 100 microns. Such preforms can be used, for example, to make optical fibers having cladding regions which alternate between regions of void free glass and void containing glass. Fibers having such alternating void containing and void-free regions would exhibit properties useful as Bragg gratings.

Figure 5:
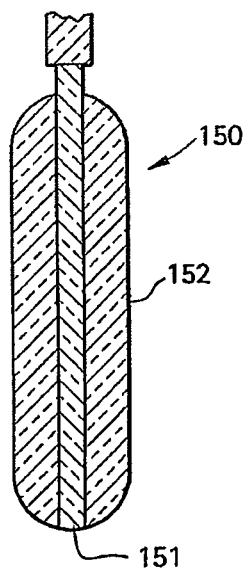
FIG. 5 illustrates the fully consolidated preform which results from the consolidation step illustrated in FIG. 4.

Referring to FIG. 5, using the techniques described above, an optical fiber preform 150 can be formed which comprises a void-free core region 151 which is surrounded by a cladding 152 which is comprised of a plurality of voids. By forming the void containing region in cladding 152 with a sufficient number of voids of an appropriate size, cladding 152 will serve as an optical cladding which guides light along core region 151 after the optical fiber preform is drawn into an optical fiber. Alternatively, the void containing region can be employed to improve the bend performance of the optical fiber. If desired, prior to drawing the preform 150 into an optical fiber, additional soot can be deposited over cladding region 152 and consolidated. The additional deposited cladding material may or may not be consolidated to contain voids, as desired.

Figure 6A:
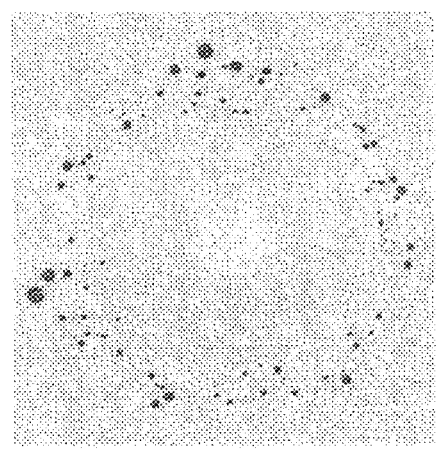
FIGS. 6A and 6B illustrate photomicrographs of a fiber made in accordance with one embodiment of the invention.
Figure 6B:
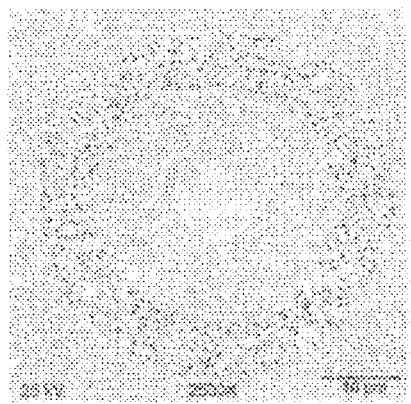

An example of a fiber which is drawn from such a preform is illustrated in FIG. 6A and 6B. The fibers in both FIG. 6A and FIG. 6B comprise a pure (i.e. no germanium dopant) silica core region which is surrounded by a cladding region which comprises a void containing region which is spaced from the core by a fluorine doped cladding region. Alternatively, a germanium doped core could be employed in which case the cladding region between the core and the void containing cladding region could be pure silica cladding. As can be seen, using the techniques disclosed herein the uniformity both in hole size and uniformity of the spatial distribution around the void containing region can be improved considerably using the techniques disclosed herein, e.g., faster fiber draw speeds, slower cane draw speeds, higher draw tensions, and deposition of thinner soot layers.

Alternatively, instead of depositing soot onto an already formed core cane, the void forming process described above can be used to form a tube of consolidated glass having a void containing region therein as described above with respect to FIG. 2, and that tube can be used to sleeve a core cane. For example, the above described process can be used to form a soot preform onto a removable mandrel 24, after which time the mandrel is removed and the soot preform is consolidated as described above to form a consolidated glass tube having voids therein. The resultant tube 65 which contains voids therein can be used to sleeve a core cane 35. Such sleeving can be accomplished, for example, using conventional rod in tube manufacturing techniques, as illustrated in FIGS. 7 and 8. In FIG. 7, pure (i.e., substantially free of index of refraction increasing dopants such as germanium) silica core cane 35 is inserted into void containing cladding sleeve portion 65, although alternatively the core region or the cladding could be doped with conventional index adjusting dopants such as germanium or fluorine. In FIG. 8, core cane 35 and cladding sleeve portion 65 are heated to a suitable temperature (e.g., greater than about 1300 to 1500° C.) and then redrawn to a smaller diameter using well known rod in tube manufacturing process steps, thereby forming an optical fiber preform from which can be drawn an optical fiber having a pure silica core region surrounded by a void containing cladding region in accordance with the invention.

Figure 9:
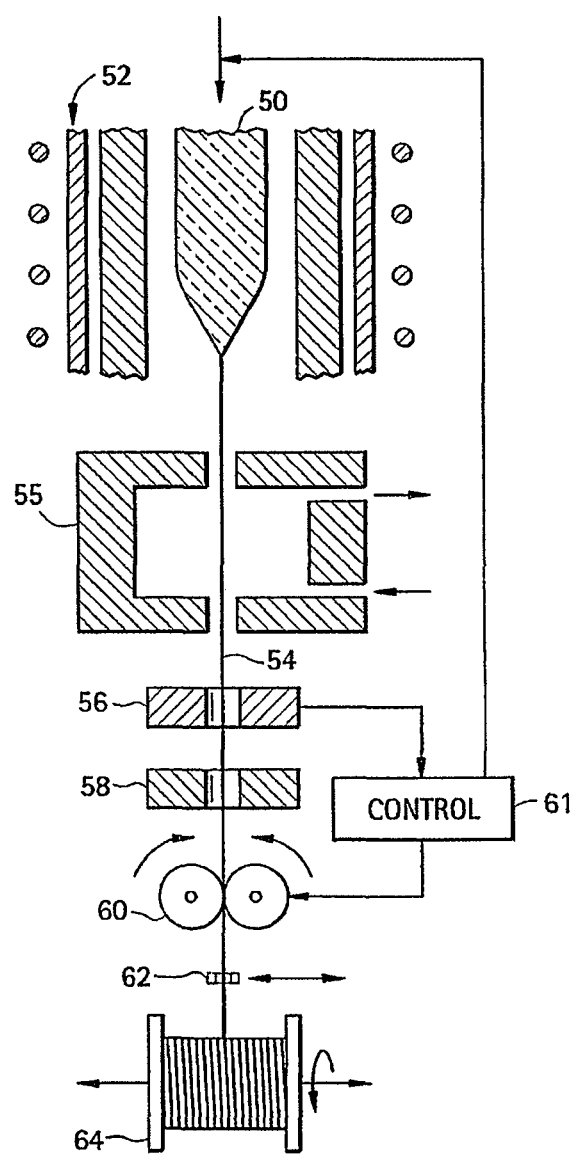
FIG. 9 illustrates a draw process and apparatus that may be employed in the method of the present invention.

In any of the embodiments disclosed herein, the resulting final consolidated optical fiber preform 50 may be drawn into an optical fiber by positioning the preform within a draw furnace 52 as shown in FIG. 9, and then heating and drawing the optical fiber 54 using conventional methods and apparatus. Applicants have discovered that by utilizing faster optical fiber draw speeds (e.g. greater than 15 meters per second, and more preferably greater than 20 meters per second, and most preferably greater than 25 meters per second), the uniformity of the spatial distribution of voids in the void containing region of the optical fiber can be greatly improved. Also, utilizing a faster draw speed will improve the uniformity of diameter of the voids in the void containing regions such that the majority of them can be achieved to have a diameter between 200 and 400 nm. It is also preferable to use a high draw tension (e.g. greater than 200 grams, most preferably greater than 250 grams, and less than 300 grams), as doing so results in less expansion of the voids in the neck down region of the optical fiber preform, and thereby improve the void-containing ring uniformity. The fiber 54 is then cooled in cooling chamber 55 and measured for final diameter by non-contact sensor 56. One or more coatings may be applied and cured by coating apparatus 58, as is also conventional. During draw, the fiber 54 passes through a tension assembly 60 whereby tension is applied to draw the fiber 54 from the preform 50. The tension is controlled via control apparatus 61 to maintain the fiber diameter at a predetermined set point. Finally, the coated fiber 54 is wound by feedhead 62 onto a fiber storage spool 64.

The same process described above with respect to FIG. 3 for forming core canes can alternatively be used to redraw void containing consolidated tubes. Such a redraw process can be used to modify the size of the voids contained in the tube. For example, the greater the diameter reduction that occurs when the void containing preform is redrawn, the smaller the void size will be in that preform.

Using the void producing consolidation techniques disclosed herein, optical fibers have been achieved which are comprised of a core region having a first refractive index and a cladding region having a second refractive index lower than that of the core such that light which is transmitted through the fiber is retained generally within the core, whereby said voids are located in and thereby form the cladding of said optical fiber and the void area percent of the voids is substantially non-zero.

Using the techniques described herein, fibers can be made wherein the maximum size of any of the voids, in the region where the fraction of power of light is greater than 80 percent, is less than the wavelength of light being transmitted for applications relating to telecommunications automotive applications. By maximum size, we mean the maximum diameter of any particular void when the optical fiber is viewed along the axial direction of the fiber in perpendicular cross-section. For example, fibers have been made wherein the maximum size of all of said voids, in the region where the fraction of power of light is greater than 80 percent, and even more preferably in the region where the fraction of power of light is greater than 90 percent, is less than 5 microns, more preferably less than 2 microns, even more preferably less than 1 micron, and most preferably less than 0.5 microns.

Using the techniques described herein, fibers can be made having void containing regions which exhibit regional void area percents of greater than 1 percent, more preferably greater than 10 percent, and most preferably greater than 30 percent.

The process described above has been generally limited to making silica core optical fiber. i.e., fibers having a relatively pure silica core region surrounded by a void containing cladding region. Alternatively, index adjusting dopants such as germanium and fluorine can be used, if desired, either individually or together, to further adjust the refractive index of the core with respect to the index of refraction of the cladding. For example, in one such preferred embodiment, a germanium core cane is used as a starter rod, upon which additional soot cladding material is deposited, preferably using OVD deposition techniques as described above. The soot cladding region is then consolidated as described above to form a void containing cladding region around the germania doped silica core region. In another alternative embodiment involving index adjusting dopants, a silica core cane is employed as the starter rod for a soot cladding region. However, during the void producing consolidation step, in addition to the void producing dopant gas, a fluorine dopant source is provided (e.g. SiF4 gas) to simultaneously dope the void containing region with fluorine. In this way, a fluorine doped void containing region can be formed around a silica core region.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of making an optical fiber comprising depositing silica glass based soot on a substrate to form at least a portion of an optical fiber preform by traversing a soot deposition burner with respect to said substrate at a burner traverse rate greater than 3 cm/sec, thereby depositing a layer of soot having a thickness less than 20 microns for each of a plurality of burner passes; and consolidating said at least a portion of the soot preform inside a furnace to remove greater than 50 percent of the air trapped in said soot preform, said consolidating taking place in a gaseous atmosphere containing krypton, argon, $SO_2$, or mixtures thereof under conditions which are effective to trap a portion of said gaseous atmosphere in said preform during said consolidation step, thereby forming a consolidated preform which when viewed in cross section will exhibit at least 50 voids therein.

2. The method of claim 1, wherein said preform when viewed in cross section will exhibit at least 10,000 voids therein.

3. The method of claim 1, wherein said consolidating taking place in a gaseous atmosphere further comprising helium.

4. The method of claim 1, wherein said consolidating taking place in a gaseous atmosphere which comprises krypton.

5. The method of claim 1, wherein said soot deposited in said depositing step comprises a portion of the cladding region of the optical fiber preform.

6. The method of claim 1, wherein said burner traverse rate in said depositing step is greater than 7 cm/sec.

7. The method of claim 6, wherein said depositing step comprises depositing a layer of soot having a thickness less than 10 microns for each of a plurality of burner passes.

8. The method of claim 6, wherein said depositing step comprises depositing a layer of soot having a thickness less than 15 microns for each of a plurality of burner passes.

9. The method of claim 1, wherein said burner traverse rate in said depositing step is greater than 10 cm/sec.

10. The method of claim 1, wherein said depositing step comprises depositing a layer of soot having a thickness less than 15 microns for each of a plurality of burner passes.

11. The method of claim 1, further comprising, subsequent to said consolidation step and prior to a step of drawing the preform into an optical fiber, drawing the consolidated preform having voids therein into a cane to thereby reduce the diameter of the consolidated preform having voids therein to a outer preform diameter which is greater than 5 mm, under conditions which are effective to cause said voids to expand in diameter during the redraw step.

12. The method of claim 11, wherein said drawing the preform into cane step comprises drawing said preform at a speed of greater than 5 cm per minute while exposing the preform to a temperature between about 1650-1775° C.

13. The method of claim 11, wherein said drawing the preform into cane step comprises drawing said preform at a speed of greater than 7 cm per minute while exposing the preform to a temperature between about 1650-1775° C.

14. The method of claim 11, further comprising drawing said fiber at a draw tension between 250 and 300 grams.

15. The method of claim 1, further comprising drawing said fiber at a draw tension greater than 200 g.

16. The method of claim 1, further comprising drawing said fiber at a draw tension between 250 and 300 grams.

* * * * *